(12) United States Patent
Carroll et al.

(10) Patent No.: US 7,562,297 B2
(45) Date of Patent: *Jul. 14, 2009

(54) METHOD FOR PROVIDING FEEDBACK ON WINDOWS, MESSAGES AND DIALOG BOXES

(75) Inventors: Mark S. Carroll, Seattle, WA (US); Corneliu I. Lupu, Redmond, WA (US); Kiran Raj, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 939 days.

This patent is subject to a terminal disclaimer.

(21) Appl. No.: 11/020,885

(22) Filed: Dec. 22, 2004

(65) Prior Publication Data

US 2005/0102622 A1      May 12, 2005

Related U.S. Application Data

(63) Continuation of application No. 09/563,523, filed on May 3, 2000, now Pat. No. 6,874,125.

(51) Int. Cl.
*G06F 3/00* (2006.01)
(52) U.S. Cl. .................. 715/705; 715/708; 715/709; 715/764; 715/781; 715/808; 715/809
(58) Field of Classification Search .................. 715/705, 715/708–709, 764, 781, 808–809, 840
See application file for complete search history.

(56) References Cited

U.S. PATENT DOCUMENTS 5,943,053 A    8/1999   Ludolph et al.

(Continued)

FOREIGN PATENT DOCUMENTS

| EP | 816991 | 1/1998 |
|---|---|---|
| EP | 967540 | 12/1999 |
| EP | 967540 A2 | 12/1999 |

OTHER PUBLICATIONS

Apple Computer Inc., "Apple Network Assistant—Manage a network of apple macintosh computers remotely over tcp/ip or appletalk", Aug. 1998, pp. 1-19.*

(Continued)

*Primary Examiner*—Boris Pesin
*Assistant Examiner*—Shen Shiau
(74) *Attorney, Agent, or Firm*—Merchant & Gould

(57) ABSTRACT

A method to globally place a feedback button in every dialog box, message box, and top-level window in every application and message box in an operating system to provide a user with the opportunity to provide feedback for the dialog box, message box, or top-level window. The system checks a setting to determine if and what type of box/window that a feedback button will be placed and if the setting is enabled, a feedback button with customizable text will be placed on the box/window when the box/window is displayed if the type of window being displayed matches the type specified as having a feedback button. The system loads a program file that provides instructions to the user on how to provide feedback to a developer or system administrator when the user selects the feedback button. Once the user enters feedback, this feedback is sent to wherever the program file designated the information to be sent. Information about the box/window being displayed, including information about how the application got to the point of displaying the box/window, is sent along with the feedback. The user may also be sent to a website to allow the user to see what other people have reported about the box/window.

18 Claims, 6 Drawing Sheets

U.S. PATENT DOCUMENTS

| | | | |
|---|---|---|---|
| 5,990,887 A | | 11/1999 | Redpath et al. |
| 6,038,296 A | * | 3/2000 | Brunson et al. ........ 379/100.11 |
| 6,057,841 A | * | 5/2000 | Thurlow et al. ............. 715/809 |
| 6,219,047 B1 | | 4/2001 | Bell |

OTHER PUBLICATIONS

"Apple Network Assistant Manage A Network of Apple Macintosh Computers Remotely Over TCP/IP or Appletalk." Apple Computer INC., 1 Infinite Loop, Cupertino, CA 95014, US, 'Online! Aug. 1998, pp. 1-19, XP002172473. Retrieved from the Internet: www.apple.com/networking/ana/pdf/anawp.pdf on Jul. 18, 2001.

"Dr. Watson and Windows 3.1" Microsoft Corporation, 'Online! Sep. 17, 1999, pp. 1-2, XP002172474. Retrieved from the Internet: http://support.microsoft.com/support/kb/articles/Q89/8/46.asp on Jul. 18, 2001.

* cited by examiner

METHOD FOR PROVIDING FEEDBACK ON WINDOWS, MESSAGES AND DIALOG BOXES

CROSS-REFERENCE TO RELATED PATENT APPLICATION

This patent application is a continuation of copending U.S. patent application Ser. No. 09/563,523, filed May 3, 2000.

TECHNICAL FIELD

This invention relates generally to networked communications, and more particularly to a system and method to allow a user to provide feedback on a dialog box or message box the user sees.

BACKGROUND OF THE INVENTION

Continued advances in computer processor technology have led to not only increased performance, but also increased performance expectations by the users of such computer equipment. These increased user expectations extend not only to the computer equipment, but also to the applications and operating systems installed on the computer equipment. The industry has responded by creating applications and operating systems that take full advantage of these performance enhancements. However, as additional functionality was added, these applications generally became more complex, increasing the likelihood of the user seeking help and errors occurring. In response, developers added additional error messages and dialog boxes and other windows (messages/windows) in an effort to help the user and also to notify the user that an error had occurred or that more information is needed, etc.

As programs and operating systems evolved, these error messages and dialog boxes often became irrelevant and unintelligible to the average user. In addition, an application working on one version of an operating system often would produce unintelligible messages on an upgraded version of the operating system. As a result, both the error messages and the dialog boxes often ended up irritating and confusing the user. Many users provided comments and other feedback to the developer or a system administrator about these messages/windows in the hope that this information would be used to fix the problems in the application. However, quite often, this feedback was of no use to the developer/administrator as the developer/administrator did not know which message/window about which the user was commenting or the sequence of events that led the user to see the message/window.

Recently, some industry members began placing buttons within the error messages that allow the user to provide feedback for that particular error message by clicking on the button. When the button is pressed, the user is provided a dialog box in which to enter comments. The comments are then sent to the developer or administrator along with an identification of the particular error message on which the user is commenting. These buttons require the application developer to add additional code to the core software for each error message on which the developer wants feedback. In view of the number of error messages that may occur, the amount of feedback code becomes significant.

While this approach provides advantages over the prior methods of providing user feedback, the inability of this approach to support existing applications and the effort of coding and debugging the required messages/windows to provide this functionality has become apparent. In order for this approach to work for an existing application, the application must be upgraded with the additional code to add the buttons. If the developer misses putting a button on an error message, there is often no way to know which error message is being commented on by the user. As a result of these problems, developers are not getting valuable feedback that would allow them to fix problems in the code.

SUMMARY OF THE INVENTION

In view of the above described problems existing in the art, the present invention provides a system that provides a way for a user to give feedback to developers and system administrators on any application. The system provides a mechanism for globally or selectively placing a feedback icon in every dialog box, message box, and top-level window in every application and message box in the system to provide the user with the opportunity to provide feedback for the dialog box, message box, or top-level window. A key feature of the instant invention is that the feedback icon can be placed in an existing application without requiring any changes to the existing application.

In order to provide this mechanism, the operating system is modified to provide the feedback icon or button in the message box, dialog box, or top-level window (hereinafter box/window) being displayed. The system checks a setting and if the setting is enabled, a feedback icon will be placed on the box/window when the box/window is displayed. The setting can be selectively set by developers or globally set by the operating system. The text in the feedback button can be customized through provision of a custom dll.

When a user logs on or when an application is started, the system checks to see if the feedback icon setting is enabled and determines the text to be displayed within the feedback button. The system also determines in what type of box/window the feedback icon will be placed. If the type of window being displayed matches the type specified as requiring a feedback icon, the system adds the feedback icon into the caption bar of the window being displayed.

If the user clicks on the feedback icon, the system loads a program file that provides instructions to the user on how to provide feedback to a developer or system administrator. Once the user enters feedback, this feedback is sent to wherever the program file designated the information be sent. Information about the box/window being displayed, including information about how the application got to the point of displaying the box/window, is sent along with the feedback. Additionally, the user may also be sent to a website to allow the user to see what other people have reported about the box/window. In addition to user comments, the system retrieves stack trace information. This detailed feedback, including the trace information on how the program came to display the box/window, provides a significant benefit to the developer and the user. The developer obtains useful information on how to improve the application and the user obtains a more useful application after the developer fixes the problems.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
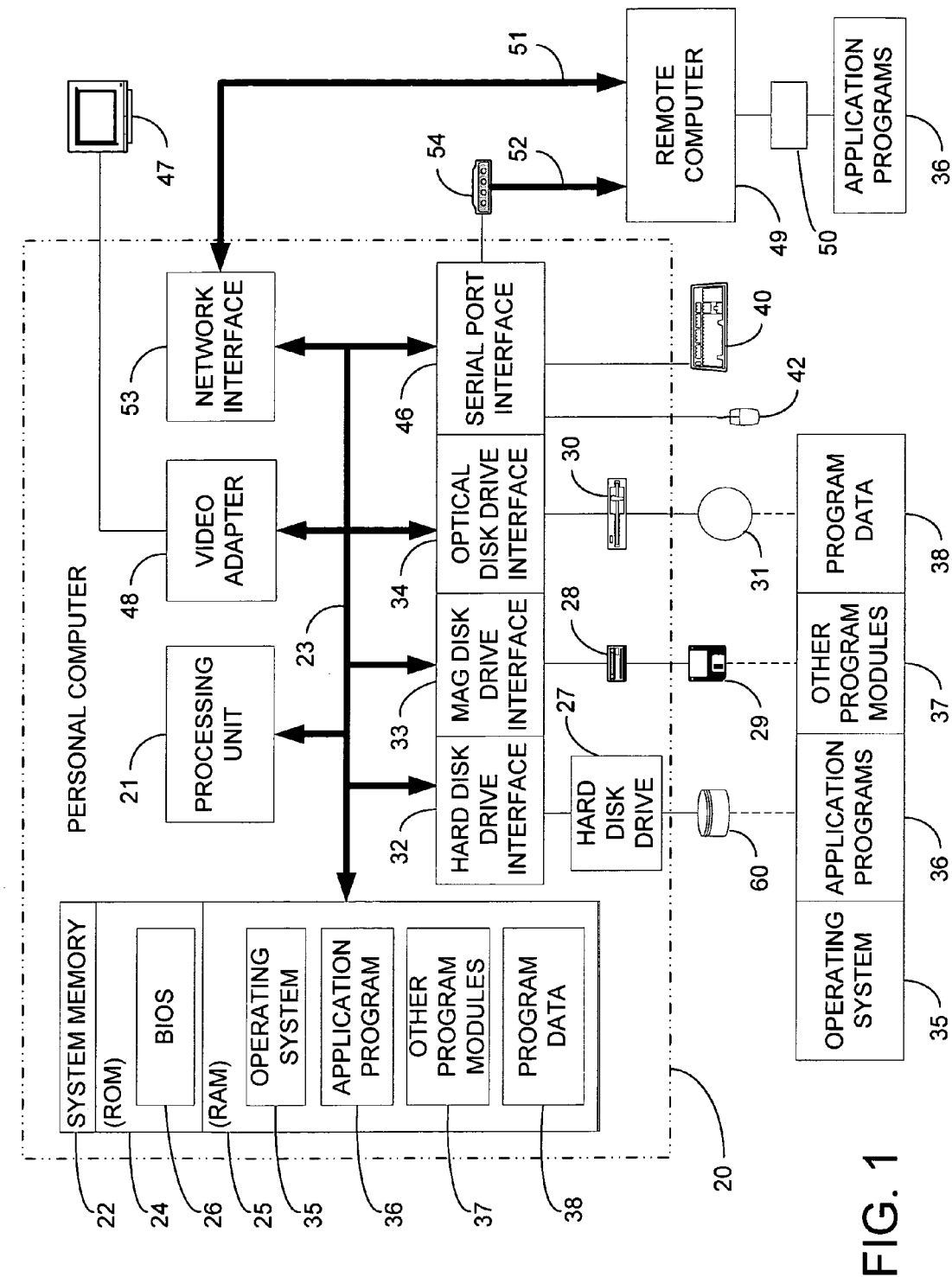
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
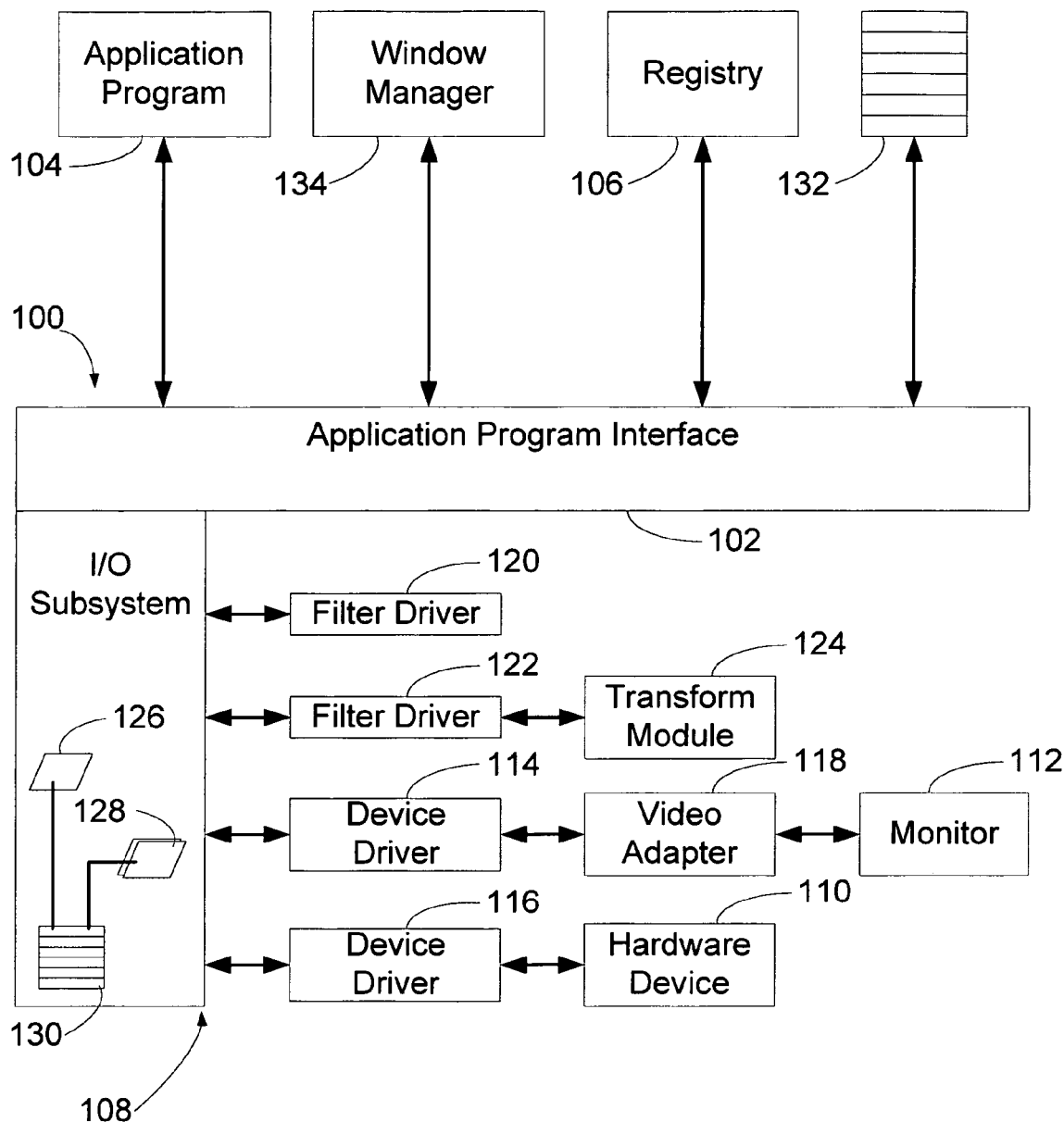
FIG. 2 shows relevant portions of an exemplary operating system for hosting the invention.

FIG. 2 shows the relevant components of an exemplary operating system 100 in which the invention operates. While operating system 100 is illustrated as the Microsoft Windows operating system, one skilled in the art will recognize that the instant invention is also applicable to other operating systems such as Linux, Mac OS, FreeBSD, Unix, etc. and is not limited to any one operating system environment. Interface component 102 communicates with other components and with software such as application programs 104 outside the operating system. Registry 106 is a database used to store configuration information. The registry 106 contains information that operating system 100 continually references during operation, such as profiles for each user, preferences for the current user, the applications 104 installed on the computer 20 and the types of documents each application 104 can create, property sheet settings for folders and application icons, what hardware exists on the system, and which ports 46 (FIG. 1) are being used. In other operating systems, this information may be in other forms of configuration files.

In the exemplary operating system, an I/O subsystem 108 supervises both file storage and other input/output devices and facilities. Requests for file or I/O services are routed between an application program or other source and hardware devices such as 110 and 112 via one or more layers of device drivers such as 114 and 116 respectively. Device 110 might be a hardware module such as a memory. Device 112 is a monitor with its video adapter 118. Filter drivers such as 120 and 122 can intercept data, file handles, and other information, based upon certain characteristics or events. Filter drivers can also process data internally as shown at 120. They can also pass information back and forth to programs such as 124, which can be located within the operating system kernel layer or at any other point in the software architecture of system 20. Components can be dedicated to a single function, or, more often, can be programmed to carry out multiple functions, either sequentially or concurrently. A digital signal processor, for example, can execute many different functions such as frequency filtering, gain change, and acoustic effects.

I/O manager 108 controls the flow of information, symbolized at 126 and 128, with stack 130 of control packets each associated with different items of information, or with packages for those items. Each packet, called an I/O request packet (IRP) is an entry in the stack 130. I/O manager 108 executes them at the appropriate times for transporting the data or other information among the attached drivers, programs, and hardware devices. A control packet is like a job order directing a module to perform a specified task upon designated data frames. Stack 132 represents a region of reserved memory in system memory 22 (FIG. 1) in which applications 104 store status data such as procedure and function call addresses, passed parameters, and sometimes local variables. Stack 132 is continually updated as applications perform tasks.

Window manager 134 implements the subsystem that builds and controls the common visual aspects of windows in the exemplary operating system 100. The window is the basic building block for displaying information in the graphical environment of the exemplary operating system 100. Window manager 134 manages how each window relates to all other windows in terms of visibility, ownership, and parent/child relationship and uses this information when creating, displaying, and destroying a window. Window manager 134 creates and displays message boxes, dialog boxes, and windows at the request of the application program 104 or at the request of other components of operating system 100.

When the operating system 100 initializes, window manager 134 creates a window known as the desktop window. The desktop window is sized to cover the entire display area on monitor 112. All other windows are displayed upon the desktop window. The operating system 100 classifies windows in a parent/child form of relationship. The desktop window is at the top of the window hierarchy. The next level of window in the window hierarchy of the operating system 100 is called a top-level window and is a child window of the desktop window. Top-level windows have only one parent window and that is the desktop window. Windows inside of a top-level window are child windows. For example, when an application 104 is loaded, the main window of that application is a top-level window. All other windows within the main window are child windows. Other windows classified as top-level windows include hard error message boxes, message boxes, and dialog boxes.

Figure 3:
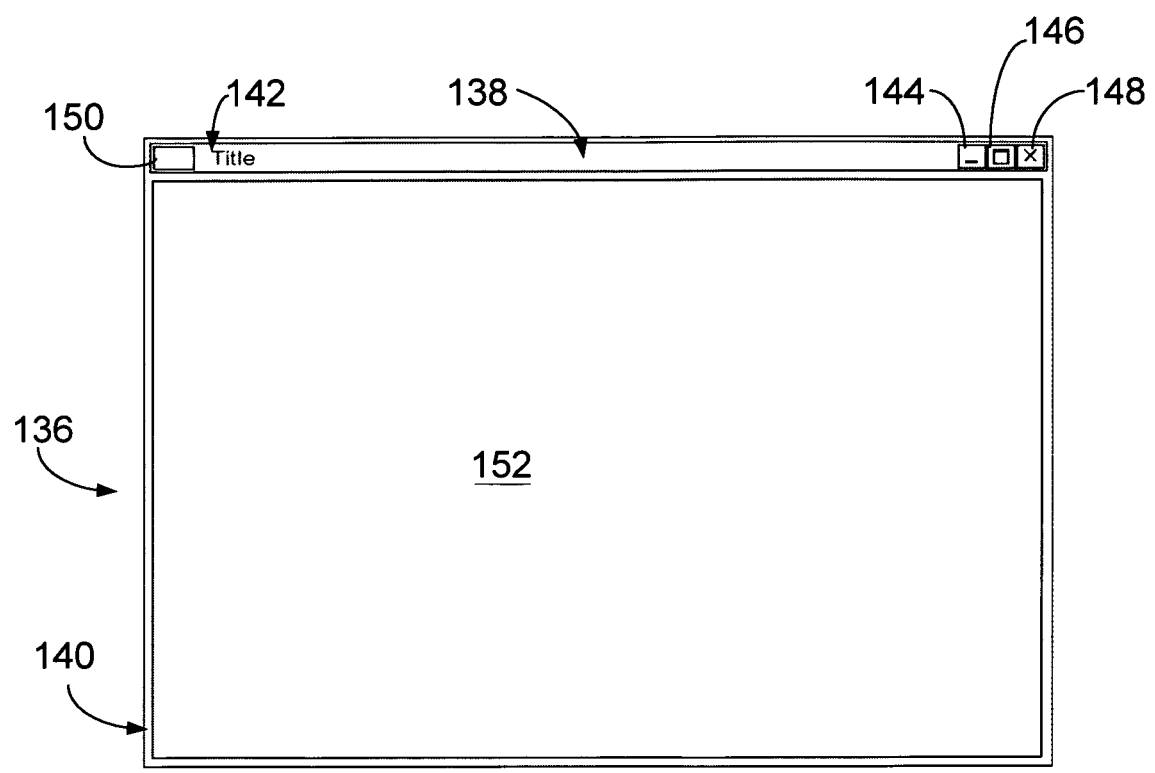
FIG. 3 shows a prior art window.

There are several types of windows that window manager 134 creates, displays and destroys. The type of window that most applications use as their main window is a window that has a caption and a border. Pop-up windows such as dialog boxes and message boxes also may have a caption bar and a border. FIG. 3 shows a window 136 having a caption bar 138 and a border 140. Windows with captions have a title field 142 and may also have a minimize box 144 that minimizes the window when a user clicks on it, a maximize box 146 that maximizes the window when the user clicks on it, a close box 148 that closes the window when the user clicks on it, and a system menu box 150 that provides the user with an interface to specified system commands. These commands include restore a minimized window, move the window with the keyboard, size the window with the keyboard, minimize the window, maximize the window, and close the window. The remaining portion of the window is an application area 152 for the application 104 to use. Within the application area 152 are the application's toolbars, document window, menu system, etc.

Figure 4:
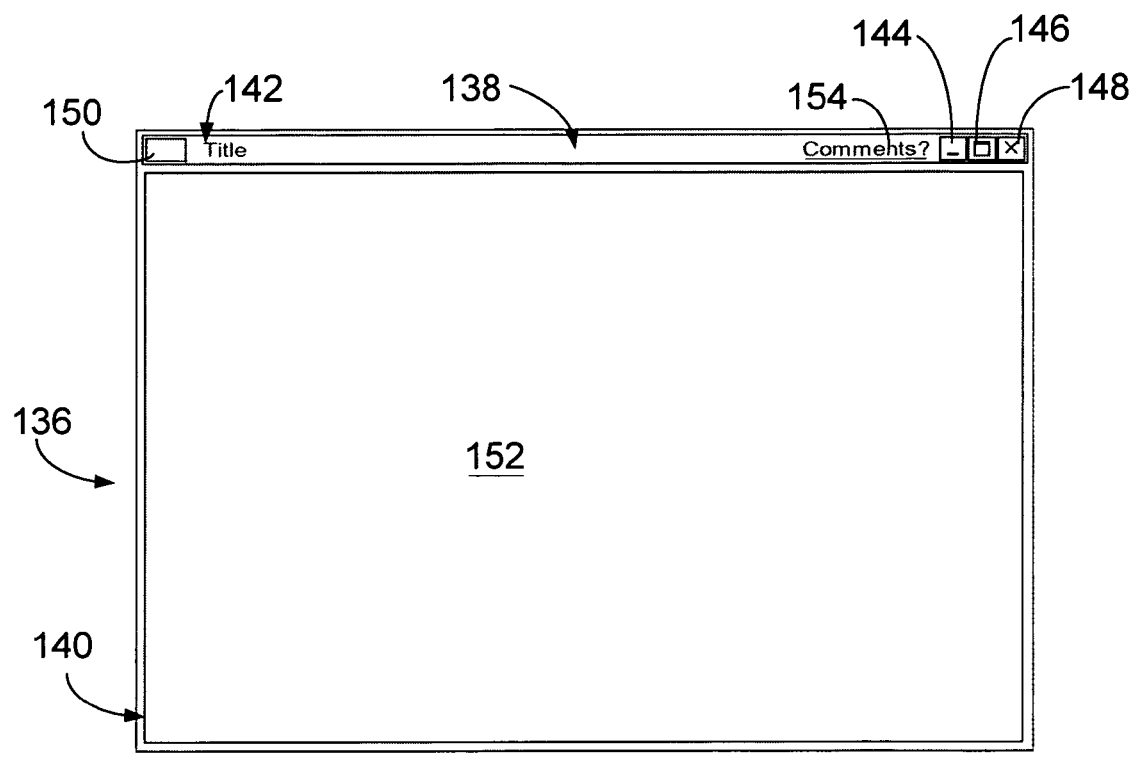
FIG. 4 shows a window having a comments button in the caption bar of a window in accordance with the teachings of the instant invention.

Whenever a top-level window is to be displayed within the desktop window, the window manager 134 checks to determine if a feedback icon or button is to be added to the window. In the illustrative operating system 100, window manager 134 checks within the registry 106 to see if a feedback icon should be shown in the window 136. Note that a feedback or comments button could also be used. In one embodiment, the feedback icon can be displayed on only hard error messages, message boxes, dialog boxes, on all top-level windows or on no windows. Window manager 134 checks the registry 106 to determine in which type of window to add a feedback button and what text should be displayed in the feedback button. Any user having system administrator privileges can provide and set the registry settings that enable the feedback icon to be displayed and the type of box, message, or window in which to display the feedback icon. It should be noted that the text is customizable and is configured within the registry 106. If the type of window being created by the window manager 134 matches one of the type specified in the registry 106 as having a feedback button, the window manager will add a feedback button 154 in the caption bar 138 as illustrated in FIG. 4.

Figure 5:
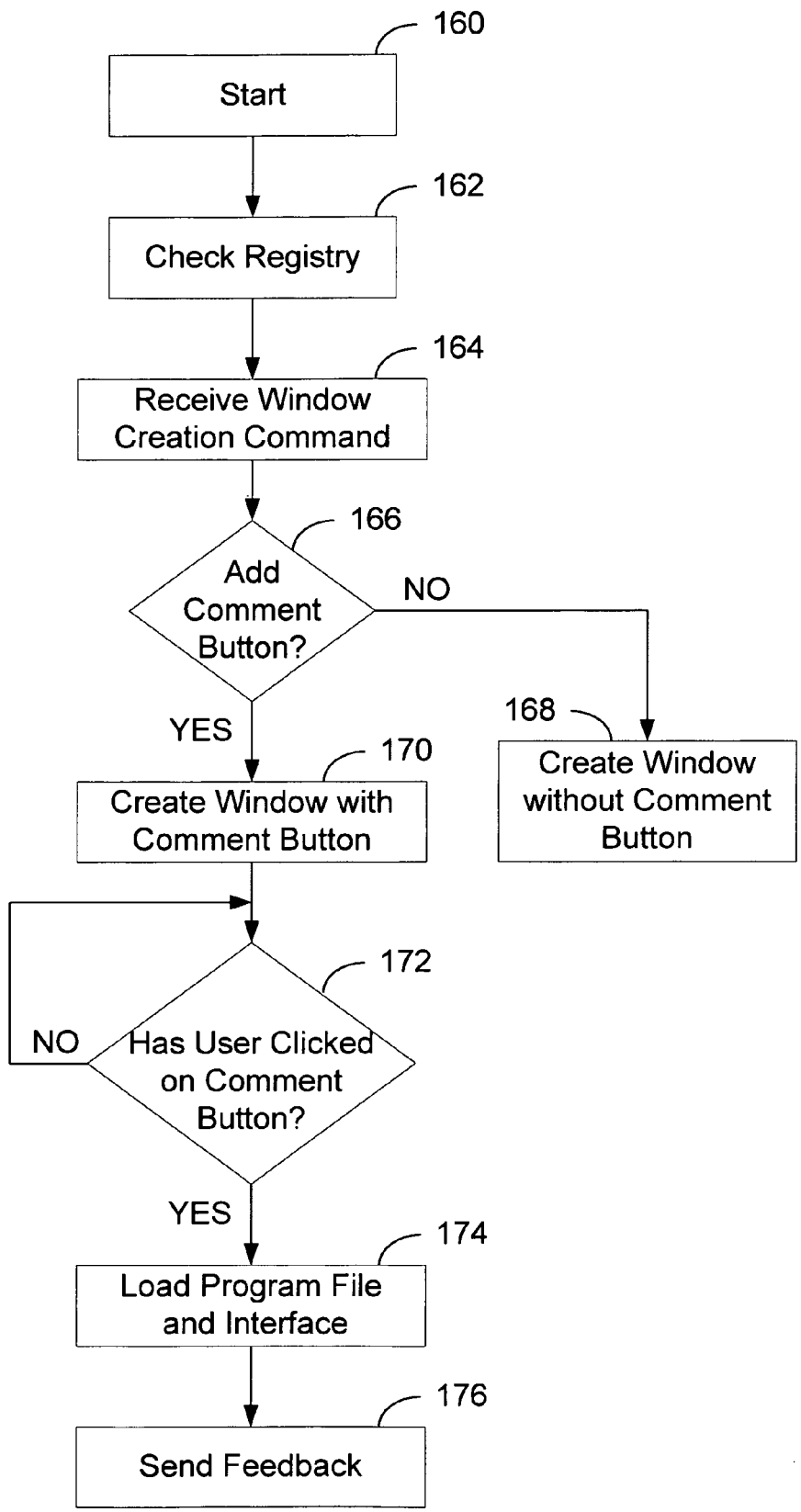
FIG. 5 is a flow chart of a process for obtaining feedback from a user.

FIG. 5 shows a flow diagram of the steps taken to provide feedback from a user. Steps 162-176 are representative of the steps the window manager 134 and other operating system components take when an application 104 is running. When the user logs on or an application starts (step 160), window manager 134 checks the registry to determine the type, if any, of window to add a comment button 154 and the text of the comment button (step 162). When window manager 134 receives a request to create a window 136 from an application 104 or another component of the operating system 100 (step 164), window manager 134 determines whether the type of window to be created matches one of the window types specified as having a feedback button (step 166). If the type of window being created does not match the window type specified, a window 136 is created without the comments button (step 168). If the window type being created does match the window type specified, a window 136 is created with the comment button 154 (step 170).

When window manager 134 detects when the user selects the comment button 154, window manager 134 looks for and loads an external program file and an application programming interface (API) (step 174). The external program file, which is a dynamic link library (dll) in the exemplary operating system 100, contains instructions and text on what should be presented to the user to obtain her feedback. A default file is provided by the operating system 100. Note that this file can be enhanced, replaced, customized, etc. by the developer or system administrator. The operating system 100 also provides a default API. The default API sends any comments provided by the user and other information to a central server for analysis. This API can be enhanced, replaced, customized, etc. by the developer or system administrator. The screen cursor shape may be changed when the user moves the cursor over the comment button 154. The window manager 134 provides the dll with the handle to the window being displayed and a stack trace. The stack trace describes the steps the application 104 and operating system 100 took to get to the point of displaying the window. It describes the procedure and function call addresses, passed parameters, and local variables stored in stack 132. With the window handle, the component that provided the resources for the message or dialog box to be loaded and the program that created the window can be determined. The developer or system administrator can provide a dll that has program specific instructions. One situation where this might arise is when there are multiple programs in various stages of development or when the developer or system administrator wants to provide a different message depending on the skill level of the user. The dll may be also programmed to gather any other information the developer or system administrator considers relevant. This could include a machine's configuration such as what video card, audio card, etc. are on the machine as some error messages may only show up on a particular machine configuration.

Figure 6:
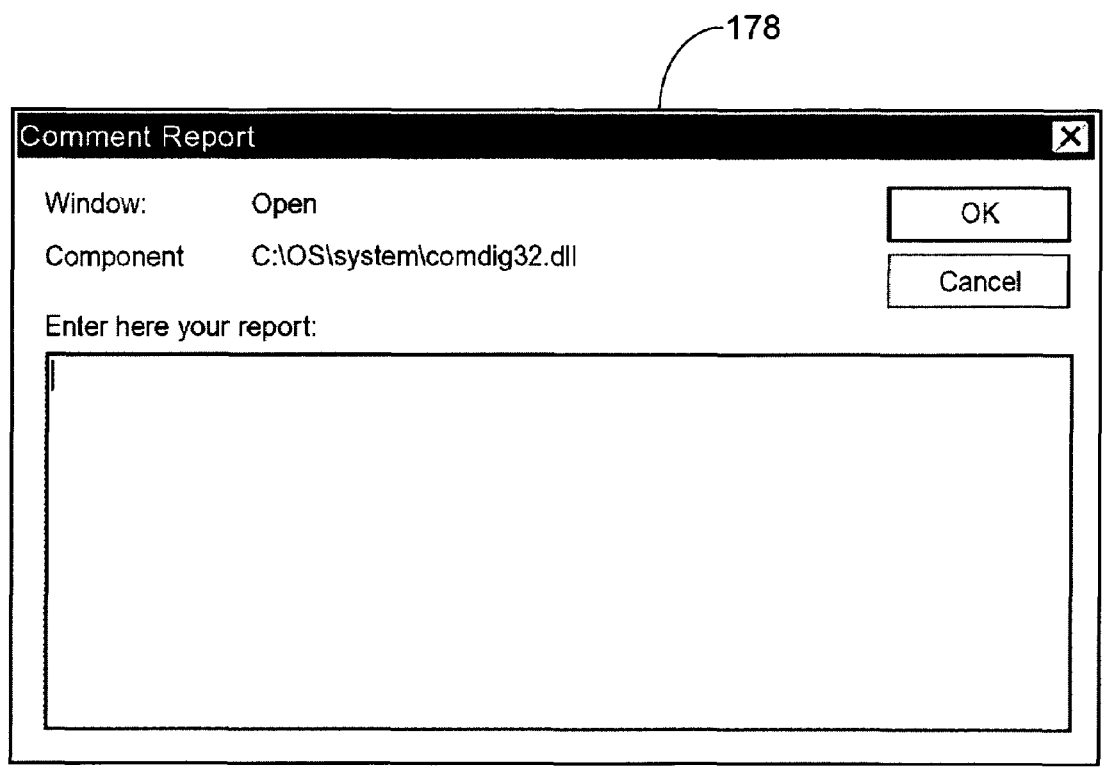
FIG. 6 shows a dialog box for entering comments in accordance with the teachings of the instant invention.

In one embodiment, this external program file is named, for example, comments_button.dll and it displays a dialog box 178 (see FIG. 6) asking the user to enter comments and feedback on that specific message or window being displayed. Once the user enters her comments, this information, along with the information about the window, is sent back to a server for analysis by the developer or system administrator via the default API.

In an alternative embodiment, the dll in conjunction with the API sends the user to a web site that collects data about the message or window being displayed. The dll and API also allows the user to see what other users have reported about the message or window being displayed, which potentially gives the user more information on the particular message or window.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention.

Therefore, the invention as described herein contemplates all such embodiments as may come within the scope of the following claims and equivalents thereof.

We claim:

1. A computer-readable medium having computer-executable instructions for performing a method for providing feedback from an external user, the method comprising:
　determining a type of top-level window to display a feedback button, wherein determining the type of top-level window to display said feedback button comprises:
　　determining if feedback buttons are to be displayed on each hard error message; and
　　determining if feedback buttons are to be displayed on each message box;
　displaying a feedback button in the type of top-level window when said type of top-level window is being displayed;
　detecting when the external user selects said feedback button;
　if the external user selects said feedback button: loading a library to instruct the external user on how to enter feedback; loading an interface;
　in response to the external user entering feedback, transferring information to the interface, wherein transferring information to the interface comprises:
　transferring an identification of the external user;
　transferring a stack trace; and
　transferring the feedback entered by the external user; and
　checking a system registry for the presence of a feedback setting to determine if a feedback button is to be displayed.

2. The computer-readable medium of claim 1 wherein if the top-level window is a top-level window of an existing application, displaying the feedback button comprises displaying the feedback button in said top-level window without changing the existing application.

3. The computer-readable medium of claim 1 wherein the feedback setting is kept on a per user basis.

4. The computer-readable medium of claim 1 wherein determining a type of top-level window to display said feedback button comprises:
　determining if feedback buttons are to be displayed on each dialog box; and
　determining if feedback buttons are to be displayed on each top-level window.

5. The computer-readable medium of claim 1 further comprising tracking functions called in response to actions taken by the external user.

6. The computer-readable medium of claim 1 wherein displaying a feedback button comprises displaying a feedback button within a caption bar of the at least one top-level window.

7. A method for providing feedback from an external user, the method comprising:
　determining a type of top-level window to display a feedback button, wherein determining the type of top-level window to display said feedback button comprises:
　　determining if feedback buttons are to be displayed on each hard error message; and
　　determining if feedback buttons are to be displayed on each message box;
　displaying a feedback button in the type of top-level window when said type of top-level window is being displayed;
　detecting when the external user selects said feedback button;
　if the external user selects said feedback button: loading a library to instruct the external user on how to enter feedback; loading an interface;

in response to the external user entering feedback, transferring information to the interface, wherein transferring information to the interface comprises:
transferring an identification of the external user;
transferring a stack trace; and
transferring the feedback entered by the external user; and
checking a system registry for the presence of a feedback setting to determine if a feedback button is to be displayed.

8. The method of claim 7 wherein if the top-level window is a top-level window of an existing application, displaying the feedback button comprises displaying the feedback button in said top-level window without changing the existing application.

9. The method of claim 7 wherein the feedback setting is kept on a per user basis.

10. The method of claim 7 wherein determining a type of top-level window to display said feedback button comprises:
determining if feedback buttons are to be displayed on each dialog box; and
determining if feedback buttons are to be displayed on each top-level window.

11. The method of claim 7 further comprising tracking functions called in response to actions taken by the external user.

12. The method of claim 7 wherein displaying a feedback button comprises displaying a feedback button within a caption bar of the at least one top-level window.

13. A system for providing feedback from an external user, the system comprising:
a memory storage; and
a processing unit coupled to the memory storage, wherein the processing unit is operative to:
determine a type of top-level window to display a feedback button, wherein the processing unit being operative to determine the type of top-level window to display said feedback button comprises the processing unit being operative to:
determine if feedback buttons are to be displayed on each hard error message; and
determine if feedback buttons are to be displayed on each message box;
display a feedback button in the type of top-level window when said type of top-level window is being displayed;
detect when the external user selects said feedback button;
if the external user selects said feedback button: load a library to instruct the external user on how to enter feedback; loading an interface;
in response to the external user entering feedback, transfer information to the interface, wherein the processing unit being operative to transfer information to the interface comprises the processing unit being operative to:
transfer an identification of the external user;
transfer a stack trace; and
transfer the feedback entered by the external user; and
check a system registry for the presence of a feedback setting to determine if a feedback button is to be displayed.

14. The system of claim 13 wherein when the top-level window is a top-level window of an existing application, the processing unit being operative to display the feedback button comprises displaying the feedback button in said top-level window without changing the existing application.

15. The system of claim 13 wherein the feedback setting is kept on a per user basis.

16. The system of claim 13 wherein the processing unit being operative to determine a type of top-level window to display said feedback button comprises the processing unit being operative to:
determine if feedback buttons are to be displayed on each dialog box; and
determine if feedback buttons are to be displayed on each top-level window.

17. The system of claim 13, further comprising the processing unit being operative to track functions called in response to actions taken by the external user.

18. The system of claim 13, wherein the processing unit being operative to display a feedback button comprises the processing unit being operative to display a feedback button within a caption bar of the at least one top-level window.

* * * * *